INVENTORS
Patrick L. Finelli
and
Walter R. Lyon
BY Brown and Mikulka
and
James L. Neal
ATTORNEYS May 12, 1970 P. L. FINELLI ET AL 3,511,146
PHOTOGRAPHIC CAMERA
Filed June 6, 1967 2 Sheets-Sheet 2

INVENTORS
Patrick L. Finelli
and
BY Walter R. Lyon
Brown and Mikulka
and
James L. Neal
ATTORNEYS

United States Patent Office 3,511,146
Patented May 12, 1970

3,511,146
PHOTOGRAPHIC CAMERA
Patrick L. Finelli, Sudbury, and Walter R. Lyon, West Roxbury, Mass., assignors to Polaroid Corporation, Cambridge, Mass., a corporation of Delaware
Filed June 6, 1967, Ser. No. 643,915
Int. Cl. G03b 17/02
U.S. Cl. 95—11
8 Claims

ABSTRACT OF THE DISCLOSURE

A photographic camera usable with electrically operated equipment and including a battery support mounted within the camera body. The support is disposed adjacent a forward portion of the camera body and locatable in a first postion for placing a pair of batteries in electrical connection with electrically operated equipment. The battery support is pivotable away from the first position to provide ready access to the batteries when the camera is not in use.

BRIEF SUMMARY OF THE INVENTION

Photographic cameras commonly utilize a variety of electrically operated equipment, both that permanently built into the camera and that of the attachment type. In either circumstance, the battery power source for the equipment may conveniently be stored in the camera body and electrically connected to the equipment in an appropriate manner. Examples of equipment of the type referred to above are photoflash means, electrically controlled photographic exposure control means, and comparison photometer means.

This invention is contemplated for use in a photographic camera of the type wherein a front portion thereof includes exposure control means and is mounted in opposed spaced relationship to a back portion which supports photosensitive material for exposure by the exposure control means. The front and back portions are connected in spaced, face-to-face relationship by connecting means enclosing the path of the light rays admitted by the exposure control means. The assembly constitutes a light tight enclosure including the front portion, back portion and the connecting means.

The shape of the connecting means necessary for establishing an operative photographic camera is dictated by the shape and size of the photographic film format and the size and shape of the exposure aperture, which is necessarily smaller than the format. Theoretically, the connecting means could circumscribe the film format and converge, so as to circumscribe the exposure aperture. The camera front and back, however, must conform to certain minimal size characteristics to enclose the necessary operative components. The front and back thereby define an envelope incorporating the space between them. By providing a connecting means which is larger than that theoretically required and which includes a relatively large part of this space, more usable area is included within the lighttight enclosure without enlarging the overall size of the envelope. The space enclosed by the connecting means adjacent the convergent end of the path of the aforesaid light rays is sufficiently large to permit a pair of batteries to be supported therein. Thus, the envelope is not enlarged by inclusion of the batteries within the enclosure. On the other hand, batteries mounted in either the front or the back of the camera would necessarily enlarge the size of the envelope to some degree.

In the preferred embodiment shown and described herein, the enclosure defines a rectangular cross-sectional shape. Battery supporting means including a frame of conforming shape is pivotally mounted within the connecting means, adjacent the wall of the camera front which faces the camera back.

The frame defines an opening through which light rays admitted through an aperture in the camera front may pass. A pair of battery supporting chambers are located upon opposing sides of the path of light rays. Hinge means connecting the frame to the inside of the enclosure is mounted on a side of the frame intermediate the sides bearing the opposed battery supporting chambers. The side opposite the hinge includes latch means for releasably retaining the frame in position adjacent the aforesaid wall of the camera front. Appropriate electrical contact means is mounted within the enclosure for making electrical contact with batteries stored in the chambers when the frame is retained against the aforesaid wall of the camera front.

To provide access to batteries supported in the frame, the latch is releasable so the frame may be swung away from its position adjacent the wall of the camera front.

It is a primary object of this invention to provide a photographic camera usable with battery operated equipment, which camera includes apparatus for storing batteries therein to supply the necessary power input for the equipment.

A further object of this invention is to provide a photographic camera which includes battery support means therein in such manner that the support means does not account for any increase in the overall size of the camera.

Other objects of the invention will in part be obvious and will in part appear hereinafter.

BRIEF DESCRIPTION OF THE DRAWINGS

The invention accordingly comprises the apparatus possessing the construction, combination of elements and arrangement of parts which are exemplified in the following detailed discloseure of a preferred embodiment taken in connection with the accompanying drawings wherein.

DETAILED DESCRIPTION OF THE DRAWINGS

Figure 1:
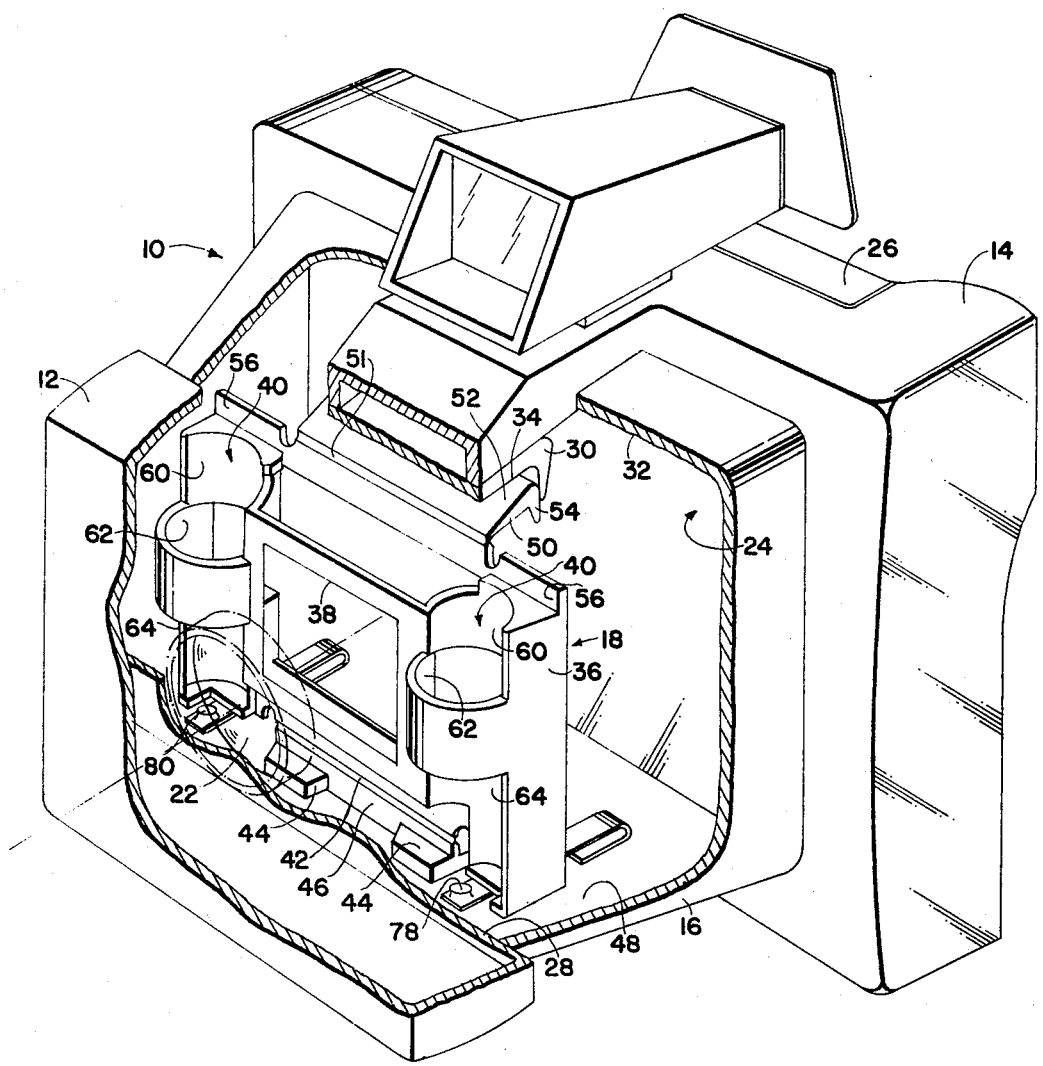
FIG. 1 is a partially broken away perspective of the photographic camera of this invention showing the battery support means in one position.

Reference is now made to FIG. 1 wherein there is shown a photographic camera having enclosure 10 including front portion 12, back portion 14, connection portion 16 and battery support means 18.

Front 12 includes exposure aperture 20 (FIG. 2), lens assembly 22, and shutter means 23. The shutter means is operated by actuator 25, the operational connection to which is not shown. Back 14 supports photosensitive material 24 and includes door means 26 to provide access to the interior of the camera. Connecting means 16 is integrally molded with back 14 and extends therefrom to surface 28 of front 12. Connecting means 16 spaces front 12 from back 14 and is mounted in lighttight fashion against surface 28 of front 12. Projection 30 extends inwardly of the connecting means from surface 32 thereof. Seat means 34 is formed adjacent projection 30.

Battery mount 18 includes rectangular frame means 36, opening 38, two battery chambers 40, hinge means 42 which mounts feet 44, latch means 50, and stops 56. The frame defines opening 38 and supports the battery chambers upon opposing sides thereof. The hinge means is located along a side of the frame intermediate the chambers; the latch means is located along the side of the frame opposite the hinge means.

Each of the chambers includes curved wall portions 60, 62 and 64 for embracing a cylindrically shaped battery.

Hinge means 42 is of the integrally molded plastic type and connects rectangular frame means 36 to member 46 to which feet 44 are affixed. Feet 44 are fixedly mounted to interior surface 48 of connecting means 16 by a heat seal or other suitable means. Manually engageable latch means 50 is joined to the frame by integrally molded plastic hinge 51. Latch means 50 includes smooth surface 52 for mating seat 34 and depending portion 54 engageable with projection 30. Stops 56 project from frame 36 for engagement with edges 68 and 69 of members 70 and 71 (FIG. 2), to limit movement of battery support means 18. Edges 68 and 69 are so disposed that, when they are engaged by stop means 56, battery support means 18 is located in its closed operative position, adjacent surface 28 of front 12.

Figure 2:
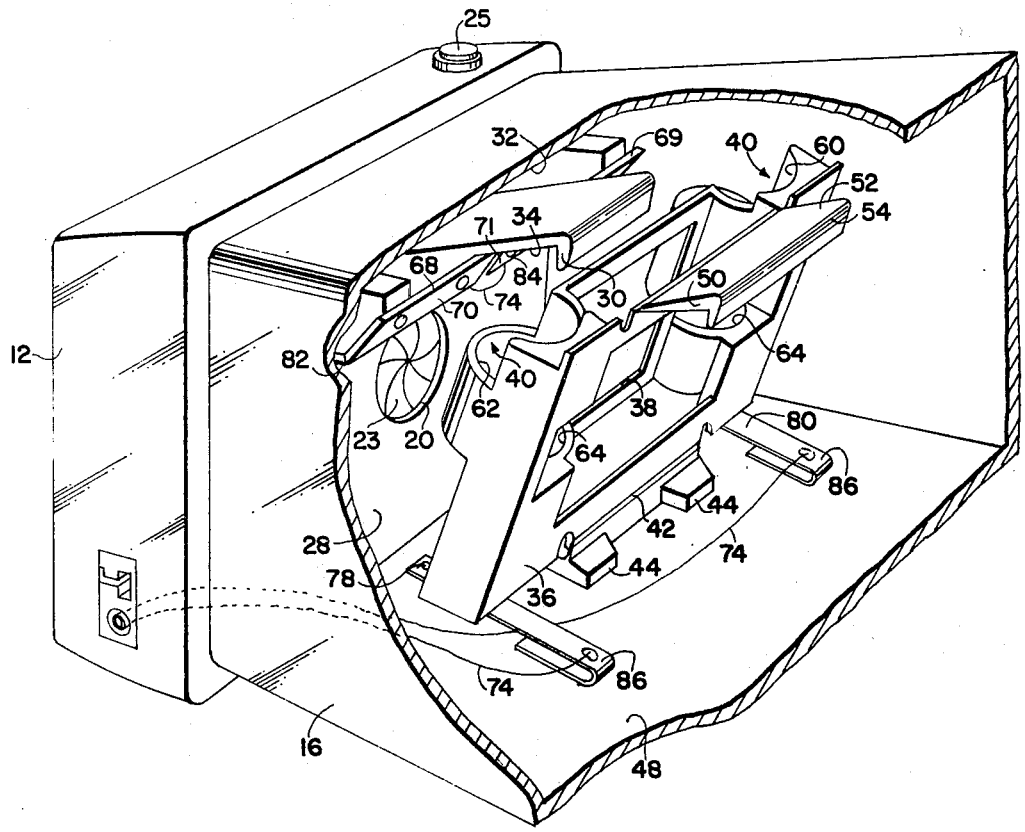
FIG. 2 is a partially broken away perspective of the apparatus of FIG. 1 showing the battery support means in another position.

Electrical circuit means 74, shown in FIG. 2, for which batteries mounted in chambers 40 are the power source, is provided. The circuitry may be for energizing any electrically energizable means usable in conjunction with a photographic camera, such as electrical terminal means for attachments, built-in photoflash means, control means for an electrically operated automatic shutter, or illumination means for use with a comparison photometer. In the embodiment shown and described, electrical terminal means 72 for an attachment such as a removable photoflash unit is shown in circuit with batteries mounted in chambers 40 for energization thereby. The photoflash unit (not shown) would include a plug adapted for electrically conductive engagement with the terminal means. It should be understood that the circuitry shown herein is by way of example only and that any desired circuitry may be used for performing any desired function.

Electrical circuit means 74 includes contact means 78, 80, 82 and 84. Contacts 78 and 80 are mounted upon surface 48 of connecting means 16 and each is resiliently biased toward a chamber 40 for engagement with a terminal of a battery installed therein. The resiliency is provided by leaf spring means 86. Contacts 82 and 84 are mounted upon a surface of connecting means 16 opposite surface 48 and are arranged for engagement with the other terminals of the batteries in the chambers 40. Terminals 82 and 84 include projecting cam portions 70 and 71 which are engageable with batteries mounted in chambers 40, to guide the batteries onto contacts 82 and 84 and to urge them downward for secure contact with resiliently biased contact means 78 and 80.

The following is a description of the operation of the above described apparatus. In the view shown in FIG. 1, battery support means 18 is in closed position wherein an electrical circuit including batteries mounted in chambers 40 may be completed. Opening 38 is located so that light admitted through the exposure aperture and focused by lens means 22 passes therethrough. Frame 36 is locked in position adjacent surface 28 of front 12 by the coaction of stop means 56 and latch means 50. Stop means 56 abuts edges 68 and 69 of members 70 and 71 and latch means 50 is so positioned that surface 52 mates with seat means 34 and depending portion 54 abuts projection 30. Latch 50 is thus engaged between projection 30 and edges 68 and 69 to retain battery support means 18 in the closed position adjacent surface 28.

Battery support means 18 is released for movement to its open position when access to batteries therein is needed. Door 26 of back 14 is opened to provide access to the interior of the camera body; latch means 50 is manually engaged by reaching in, through the camera back. The latch is moved downwardly about hinge 51 until depending portion 54 is clear of projection 30. The frame 36 is then pivoted away from surface 28, about hinge 42. This moves chambers 40 to a position wherein batteries may be inserted or withdrawn.

When closing battery support means 18, latch means 50 is manually gripped and used to pivot frame 36 about hinges 42 toward surface 28. During this movement, surface 52 of latch means 50 moves along the depending edge of projection 30 until stop means 56 engages edges 68 and 69. The latch means is then pivoted about hinge 51 to return surface 52 to mating engagement with seat means 34 and to return depending portion 54 of the latch means to a position wherein it abuts projection 30. Hinge 51 provides enough inherent resiliency to retain surface 52 against seat means 34. Door 26 may then be closed to ready the camera for operation.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic camera comprising:
   (a) a lighttight enclosure including means for supporting photosensitive material therein, adjacent a back portion thereof, and including structure adjacent a front portion of said enclosure having an exposure aperture and shutter means for controlling light passing through said aperture during a photographic exposure;
   (b) electrically energizable means for use in connection with photographic exposures controlled by said shutter means; and
   (c) frame means pivotally mounted within said enclosure for supporting at least one electrical battery in electrical connection with said energizable means, closely adjacent the back of said front structure and beside the path of said light passing through said exposure aperture, said frame means being selectively movable away from said position closely adjacent the back of said front structure to provide access to said battery.

2. Photographic apparatus according to claim 1 wherein said frame means is disposed within the path of said light passing through said exposure aperture during a photographic exposure and said frame means further comprises means forming an opening through which said light may pass.

3. A photographic camera comprising:
   (a) a lighttight enclosure including means for supporting photosensitive material therein, adjacent a back portion thereof, structure adjacent a front portion of said enclosure having an exposure aperture and shutter means for controlling light rays passing through said aperture for impingement upon said photosensitive material during a photographic exposure, and a connecting portion spacing said front portion from said back portion in opposed face-to-face relationship for completely enclosing the path of said light rays;
   (b) electrically energizable means for use in connection with photographic exposures controlled by said shutter means; and
   (c) means for supporting elongated batteries inside said connecting means adjacent the surface of said front portion which faces said back portion with the longitudinal axis of each battery in a plane substantially normal to the optical axis of said exposure aperture, said batteries being located intermediate said path of said light rays and said connecting portion of said enclosure means and supportable for electrical connection with said energizable means.

4. A photographic camera according to claim 3 wherein said battery support means comprises:
   (a) frame means positioned in said connecting portion of said enclosure, adjacent said surface of said front means facing said back means;
   (b) means forming an opening in said frame means through which said light rays may pass during a photographic exposure; and
   (c) battery receiving chamber means in said frame means, said chambers being located on opposite sides of said path of said light rays.

5. A photographic camera according to claim 4 wherein said frame means is substantially rectangular and comprises means forming a pair of battery receiving chambers in opposed sides of said frame means, on opposite sides of said path of said light rays.

6. A photographic camera comprising:
   (a) a lighttight enclosure including means for supporting photosensitive material therein, adjacent a back portion thereof, structure adjacent a front portion of said enclosure having an exposure aperture and shutter means for controlling light rays passing through said aperture for impingement upon said photosensitive material during a photographic exposure, and a connecting portion spacing said front portion from said back portion in opposed face-to-face relationship for completely enclosing the path of said light rays;
   (b) electrically energizable means for use in connection with photographic exposures controlled by said shutter means;
   (c) frame means positioned in said connecting portion of said enclosure, adjacent the surface of said front portion which faces said back portion, for supporting batteries inside said connecting portion adjacent said surface of said front portion, intermediate said path of said light rays and said connecting portion of said enclosure means;
   (d) means forming an opening in said frame means through which light rays may pass during photographic exposure;
   (e) battery receiving chambers in said frame means, said chambers being located on opposite sides of said path of said light rays;
   (f) means pivotally mounting said frame means to the inside of said connecting portion; and
   (g) manually engageable latch means mounted upon said frame means for releasably securing said frame means adjacent said surface of said front portion which faces said back portion, said latch means being manually operable to release said frame means for pivotal movement away from said surface of said front portion, to provide access to said battery chambers.

7. A photographic camera comprising:
   (a) a lighttight enclosure including means for supporting photosensitive material therein, adjacent a back portion thereof, structure adjacent a front portion of said enclosure having an exposure aperture and shutter means for controlling light rays passing though said aperture for impingement upon said photosensitive material during a photographic exposure, and a connecting portion spacing said front portion from said back portion in opposed face-to-face relationship for completely enclosing the path of said light rays;
   (b) electrically energizable means for use in connection with photographic exposures controlled by said shutter means;
   (c) substantially rectangular frame means positioned in said connecting portion of said enclosure, adjacent said surface of said front portion which faces said back portion, for supporting batteries inside said connecting portion adjacent said surface of said front portion, intermediate said path of said light rays and said connecting portion of said enclosure means;
   (d) means forming an opening in said frame means through which light rays may pass during a photographic exposure;
   (e) a pair of battery receiving chambers in opposed sides of said frame means, on opposite sides of said path of said light rays;
   (f) hinge means on a side of said rectangular frame means between said battery supporting chambers for pivotally mounting said frame means to the inside of said connecting portion of said enclosure; and
   (g) manually engageable latch means mounted upon the side of said frame means opposing said hinge means for releasably securing said frame means in a position adjacent said surface of said front portion of said enclosure which faces said back portion thereof, said latch means being manually operable to release said frame means for pivotal movement from a closed position adjacent said surface of said front portion to an open position removed from said surface of said front portion, to provide access to said battery chambers.

8. A photographic camera according to claim 7 further comprising electric circuit means for electrically connecting said electrically energizable means to batteries mounted in said chambers, said electrical circuit means comprising:
   (a) first contact means resiliently mounted adjacent said side of said frame means to which said hinge means is mounted, adjacent said opposed battery chambers for engaging one terminal of batteries located in each of said opposed battery chambers when said frame means is in said closed position;
   (b) second contact means fixedly mounted adjacent said side of said frame means opposite the side adjacent which said first contact means is mounted, adjacent said opposed battery chambers, for engaging a second terminal of batteries located in each of said battery chambers when said frame means is in said closed position; and
   (c) cam means extending from said second contact means toward said back portion of said enclosure for engaging batteries located in said opposed chambers during movement of said frame means from said open position to said closed position, to move said one terminal of said batteries into secure contact with said first contact means and to guide said second terminal of said batteries into contact with said second contact means.

References Cited

UNITED STATES PATENTS 3,344,725  10/1967  Finelli _____ 95—11
3,001,461  9/1961   Irwin _____ 95—11.5

NORTON ANSHER, Primary Examiner

R. W. ADAMS, Assistant Examiner